United States Patent [19]

Fellows et al.

[11] Patent Number: 4,790,465
[45] Date of Patent: Dec. 13, 1988

[54] CLEAVING OPTICAL FIBERS

[75] Inventors: Andrew T. Fellows, London; Nicholas D. Channon, Salisbury, both of England

[73] Assignee: York Technology Limited, Hampshire, England

[21] Appl. No.: 47,386

[22] Filed: May 8, 1987

[30] Foreign Application Priority Data

May 9, 1986 [GB] United Kingdom ............... 8611399

[51] Int. Cl.⁴ ............................................ C03B 37/16
[52] U.S. Cl. .................................... 225/2; 125/23 R; 225/96; 225/101; 225/103
[58] Field of Search ................ 225/2, 96, 93, 103, 225/96.5, 101; 51/59 SS; 125/23 R

[56] References Cited

U.S. PATENT DOCUMENTS

| | | | |
|---|---|---|---|
| 2,967,381 | 1/1961 | Brown | 51/157 |
| 4,039,309 | 8/1977 | Albanese et al. | 65/2 |
| 4,391,168 | 7/1983 | Gerber et al. | 83/34 |
| 4,445,632 | 5/1984 | Margolin et al. | 225/2 |
| 4,450,995 | 5/1984 | Leiby et al. | 225/2 |
| 4,607,775 | 8/1986 | Krause | 225/96.5 |
| 4,619,387 | 10/1986 | Shank et al. | 225/96.5 |

FOREIGN PATENT DOCUMENTS

| | | |
|---|---|---|
| 2082565 | 3/1982 | European Pat. Off. . |
| 3015645 | 4/1981 | Fed. Rep. of Germany . |
| 3317304 | 12/1983 | Fed. Rep. of Germany . |
| 2082565 | 3/1982 | United Kingdom ................. 83/170 |
| 2118539 | 11/1983 | United Kingdom . |

Primary Examiner—Frank T. Yost
Attorney, Agent, or Firm—Armstrong, Nikaido, Marmelstein & Kubovcik

[57] ABSTRACT

Cleaving of an optical fibre (2) is achieved by bringing a fibre cleaving blade (3) into lateral contact with such a fibre. Undue intrusion of the blade into the fibre during prior art cleaving processes can damage the fibre so as to detract from the quality of the resulting cleaved fibre end surfaces. Improvemets in the quality of the resulting end surfaces can be obtained in relation to prior art techniques by superimposing a relatively small amplitude vibratory component on a relatively steady movement of the blade towards the fibre. This can also enable the conventional use of a backing anvil at the cleaving location to be dispensed with, thereby removing danger of contamination from the anvil.

13 Claims, 4 Drawing Sheets

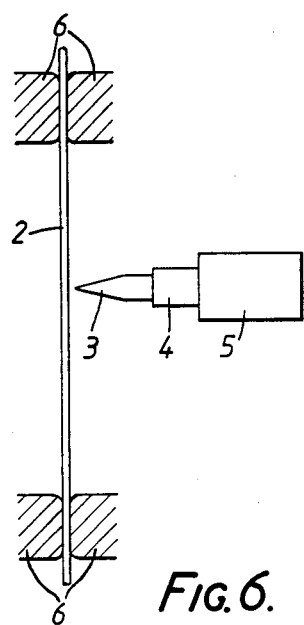
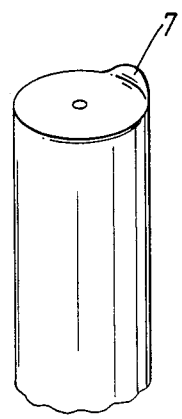
FIG. 6.    FIG. 9.
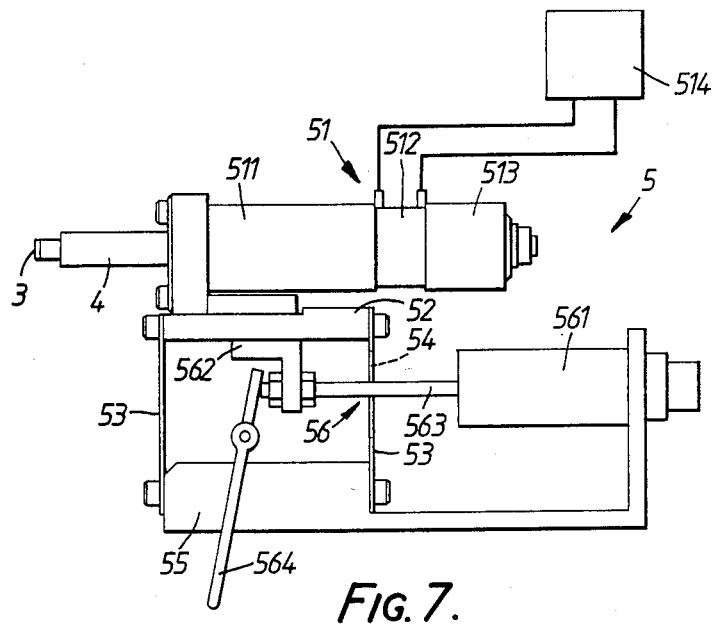
FIG. 7.

CLEAVING OPTICAL FIBERS

The present invention relates to cleaving optical fibres.

Silica (optical) fibre ends are commonly prepared for a variety of purposes (jointing, characterization etc.) by a process known as cleaving. In such a process, a blade prepared from a hard material such as diamond is brought into lateral engagement with a fibre to be cleaved in such a manner as to initiate a fracture which subsequently propagates through the fibre cross section until the fibre parts. Fibre cleaving tool designs currently in use feature a single blade-to-fibre contact with a radial and possibly also a circumferential component of motion.

The resulting cleaved fibre end surfaces should, as far as possible, be optically flat and perpendicular to the fibre longitudinal axis. Undue intrusion of the blade into the fibre during the cleaving process can damage the fibre so as to detract from the quality of the resulting end surfaces.

In conventional cleaving processes it has been regarded as necessary to support the fibre behind the region of contact by a shaped anvil block, to ensure that the fibre does not bend under the blade pressure. Such bending could give rise to unwanted compressive longitudinal stresses. However, satisfactory visual monitoring of the cleaving process can then be difficult to achieve, bearing in mind the high degree of precision that is desirable, because of the presence of the anvil (even if a transparent anvil is used). In addition, contamination of the anvil by particles of dust, etc., can cause a fibre to cleave at a position other than that desired, and occasionally a fibre shatters on being pressed against the anvil.

According to a first aspect of the present invention there is provided a method of cleaving an optical fibre, comprising the steps of: supporting the said fibre in a working position; bringing about steady movement of a cleaving blade towards a point of lateral contact with the said fibre, behind which point the fibre is laterally unsupported; and superimposing on the said steady movement of the blade a vibratory component of movement, said vibratory component being towards and away from the axis of the fibre and having a frequency in a range from one kilohertz to one hundred kilohertz, thereby to facilitate the desired cleaving.

Thus a second aspect of the present invention comprises apparatus for cleaving optical fibres, comprising: clamp means, defining two mutually-spaced clamping locations, for holding an optical fibre extended between the two clamping locations but unsupported laterally therebetween; a fibre cleaving blade, adapted to be brought into lateral contact with such a fibre at a desired cleaving point between said two clamping locations, to achieve cleaving of the said fibre at the said point; and vibratory drive means, carrying the said blade and operable to subject it to a relatively small-amplitude vibratory component of movement superimposed on a relatively steady movement of the blade towards the said desired cleaving point, the superimposed vibratory component of the movement being towards and away from the said cleaving point and having a frequency in a range from one kilohertz to one hundred kilohertz.

Thus, in an embodiment of the present invention, the fibre is not backed by an anvil at its cleaving location, since surprisingly it has been found that when an embodiment of the present invention is used to cleave the fibre it is no longer necessary to employ an anvil.

Such an embodiment of the present invention can allow cleaving of a fibre to be monitored with ease, and with reduced intrusion of the blade into the fibre as compared with prior cleaving apparatus, while still giving desirably good end angles.

The vibratory blade motion may be provided by a device capable of generating ultrasonic mechanical vibration of controlled amplitude and frequency. In an embodiment of the invention the approach of the blade to the fibre, and its withdrawal therefrom after cleaving, may be produced either by a variable offset control signal to a device that produces the vibratory motion, or by means separate from that device.

Reference will now be made, by way of example, to the accompanying drawings, in which:

FIG. 6 shows a schematic plan view of apparatus, for cleaving an optical fibre, embodying the second aspect of the present invention;

FIG. 7 shows a more detailed side view of a portion of the apparatus shown in FIG. 6;

FIG. 9 shows a perspective view of a fibre end cleaved using a prior technique.

Figure 1:
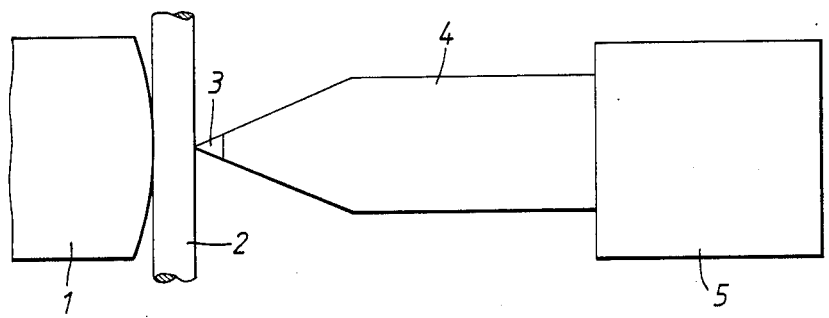
FIGS. 1 and 2 show plan and side views respectively of part of an apparatus for cleaving an optical fibre.
Figure 2:
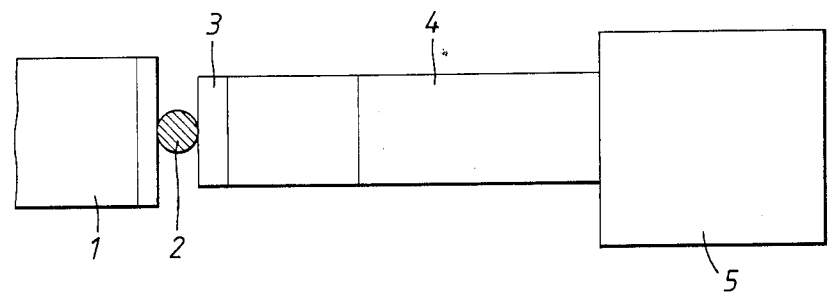

In FIGS. 1 and 2 a conventionally-positioned anvil 1 is shown, but it is to be understood that this anvil is not present in an embodiment of the invention now to be described with reference to those Figures. A cleaving blade 3 is mounted in a blade assembly 4 the position of which is controlled by drive means 5, which may comprise a bi-directional linear actuator, for moving the blade towards a fibre 2 (positioned horizontally in this embodiment). The fibre 2 extends between two supporting clamps (not shown in FIG. 1) in conventional manner.

Figure 3:
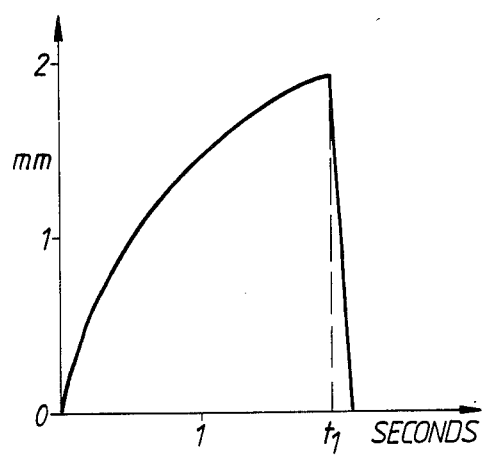
FIGS. 3 to 5 are graphs.
Figure 4:
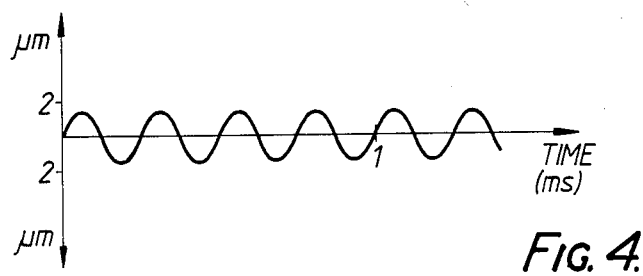
Figure 5:
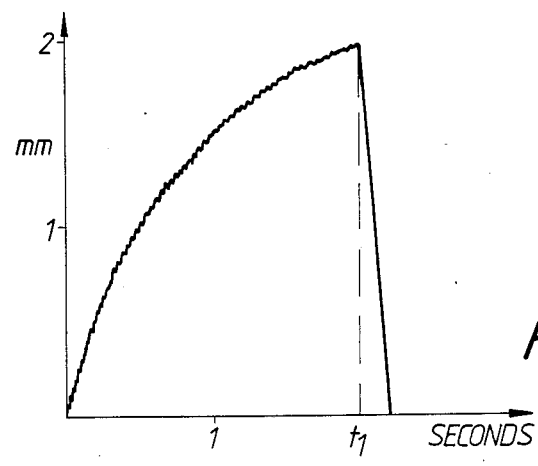

In operation, the blade carried by the blade assembly is subjected to steady movement towards the desired cleaving point of the fibre (it being borne in mind that the anvil shown in FIGS. 1 and 2 is omitted) in accordance with the graph of FIG. 3 (in which displacement is plotted vertically, against time along the horizontal axis), whilst a relatively small amplitude oscillation, as shown to an enlarged scale in FIG. 4, is superimposed upon that steady movement. FIG. 5 illustrates the resultant motion of the blade. In the graphs of FIGS. 3 and 5, $t_1$ represents the instant at which cleaving is achieved.

The displacement/time relationship illustrated in FIG. 3 follows an approximately exponential law with a time constant of the order of one second. Typically, the time $t_1$ taken to complete a full forward stroke of, for example, approximately 2 mm is about two to three seconds, but may be up to ten seconds. The rate of approach of the blade to the fibre may be controlled so as to tend towards zero, approximately, as the blade reaches the position at which cleaving is likely to be achieved.

The superimposed oscillation is along the main direction of motion of the blade, towards and away from the fibre, and may be of any suitable wave-form, for example, sine, square or triangular. The oscillation may have a frequency ranging from about 1 kHz (in which case the oscillation may be produced by the same actuator that produces the main motion) up to about 100 kHz (in which case the oscillation would be produced by a separate device, for example a piezo-electric transducer, carried by the main drive means). For this range of frequencies, the amplitude of oscillation (peak to peak) may typically be within the range 1 micrometer to 10 micrometers. At a frequency of about 4 kHz, for example, the oscillation may have an amplitude of about 2 micrometers (peak to peak).

This technique has been experimentally evaluated and found to be capable of cleaving fibres to produce end surfaces of adequate quality. By using an oscillatory component having an amplitude of the order of micrometers and a frequency of the order of kilohertz, combined with a sufficiently slow rate of approach (typically slower than 1 ms$^{-1}$, such that the impact of the non-vibrating blade would not be adequate to cleave, or cause damage to, the fibre) the blade intrusion into the fibre cross-section can be reproducibly minimized.

Several hundred fibre ends prepared using this technique have been microscopically examined and the extent and nature of blade-induced damage has been acceptable in every case. A variety of fibres with diameters (core plus cladding) ranging from about 80 to about 200 micrometers have been cleaved satisfactorily in this way.

In the apparatus of FIG. 6, a length of optical fibre 2 is supported between clamps 6 in a horizontal working position. A cleaving blade 3 is mounted in a blade assembly 4 the position of which is controlled by drive means 5.

Previous experiments using a non-vibrating blade to cleave a fibre without the use of a supporting anvil have not provided reliably satisfactory results, as the fibre tends to yield as the blade approaches, causing the region adjacent to the blade to be in compression. Cleaved ends produced under such conditions are characterised by a "lip" formation, as shown at 7 in FIG. 9, and by poor end angles.

Portions of the apparatus of FIG. 6 are shown in more detail in FIGS. 7 and 8. In FIG. 7, the cleaving blade 3 comprises a diamond blade driven to vibrate at, for example, approximately 70 kHz by the drive means 5. This vibration is produced by a piezo-electric transducer 51 comprising a piezo-electric crystal 512 sandwiched between a resonant acoustic horn 511 on which the blade assembly 4 is mounted, and a backmass 513 complementary to the horn 511. The transducer 51 is driven by a self-tuning oscillatory drive circuit 514, of conventional design, to ensure that resonance is maintained under expected mechanical loading conditions. The electrical power consumption of the transducer 51 is approximately 1.5 watts and efficiency is about 50%. The oscillatory drive circuit 514 is energised to bring about vibration of the transducer 51 so as to superimpose a vibratory component on a steady movement of the blade 3. The vibrations are perpendicular to the fibre axis and parallel to the direction of approach of the blade 3 to the fibre 2. In this example, the mechanical amplitude (peak to peak) of the oscillation is in the range from 0.5 μm to 1.5 μm. The free length of the fibre 2 between the clamps 6 is 30 mm and is held under an applied axial tension of approximately 1.5 Newtons in this example. Typically there may be a length of fibre 2, between the clamps, ranging from 5 mm to 100 mm and the tension applied to the fibre 2 will vary with the size of the fibre 2.

The vibrating blade assembly 4 and piezo-electric transducer 51 are mounted on a support member 52, which is in turn mounted on a pair of parallel leaf springs 53, at least the right-hand one of which (as viewed in FIG. 7) has a central aperture 54, secured to a base 55 and to the member 52 in such a way that flexure of the leaf springs 53 does not result in the application of any significant transverse component of motion to the blade assembly 4.

In addition to the transducer 51, the drive means 5 also comprise advancing means 56, for producing a relatively steady movement of the blade 3 towards the fibre 2, the advancing means 56 comprising a compression spring in a cylinder 561, an actuating rod 563 carried by the spring, and a bracket 562, secured to the base of the member 52, to which the actuating rod 563 is connected. The spring in the cylinder 561 is normally held compressed (to the right in FIG. 7) by means of an operating lever 564 (shown in purely diagrammatic form in FIG. 7). When the lever 564 is moved to the right (with respect to FIG. 7), the spring in the cylinder 561 is released and, by means of the actuating rod 563 and bracket 562, pushes the blade assembly 4 mounted on the member 52 forward in a manner which is highly damped by pneumatic damping means in the cylinder 561. In this way the blade assembly 4 is subjected to a relatively steady movement, through a distance of around 2 mm to 3 mm, in a direction perpendicular to the axis of the fibre 2 held between the clamps 6 of FIG. 6. The vibrating blade assembly 4 and piezo-electric transducer 51 can be moved away from the fibre 2, after cleaving, by operation of the lever 564 so as to return the support member 52 to its starting position and compress the spring in the cylinder 561.

Figure 8A:
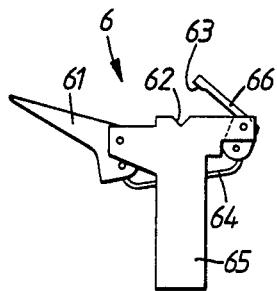
FIGS. 8A, 8B and 8C show more detailed side views of another portion of the apparatus shown in FIG. 6.
Figure 8B:
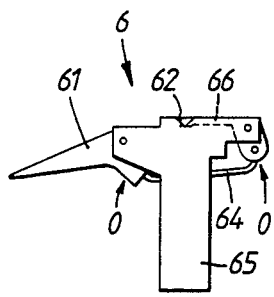
Figure 8C:
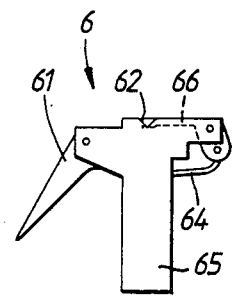

One of the clamps 6 of the apparatus shown in FIG. 6 is shown in greater detail in FIGS. 8A, 8B and 8C. FIG. 8A shows the clamp 6 open, FIG. 8B shows the clamp 6 closed and FIG. 8C shows the clamp 6 locked. The clamp 6 has a base member 65, at an upper surface of which is formed a lower clamp face 62 of a type known as a precision V-groove. In use, a fibre portion (not shown in FIG. 8) that is to be clamped is placed in the V-groove, so as to extend longitudinally therealong, the V-groove being of uniform cross-section and shown end-on in FIG. 8.

Pivotally connected to one side of the base member 65 is a lever 66 provided underneath a free upper end portion thereof with a plane upper clamp face 63. An operating lever 61 is pivotally connected to the other side of the base member 65, and a spring link 64 is connected between respective lower arms of the levers 61 and 66.

Manually effected anti-clockwise rotation of the operating lever 61 acts through the link 64 to cause the lever 66 to rotate in an anti-clockwise sense so that the upper clamp face 63 is moved towards the lower clamp face 62, thereby closing the clamp 6 as shown in FIG. 8B. Further anti-clockwise rotation of the lever 61, to the position shown in FIG. 8C, produces an over-dead-centre action which effectively locks the clamp 6. In use, of course, the fibre portion (not shown) in the V-groove of the clamp face 62 will thus be locked firmly in position between the two clamp faces.

Although a clamp having a precision V-groove is itself known, the clamp 6 used in the apparatus of FIG. 6 has clamp faces 62 and 63 made of a very hard material, typically hardened steel or tungsten carbide, in contrast to the softer clamp faces, such as those made of rubber, which are used conventionally for clamping optical fibres. The clamps 6 are thereby such that the fibre 2 is not rotated when the clamps 6 close upon it, i.e. there is no torsional stress applied to the fibre 2. Torsional stress applied to a fibre during cleaving can cause the cleave to propagate across the fibre 2 at an angle of up to 45° with respect to the fibre axis, rather than 90° as desired. Typically, the V-groove of the lower clamp face 62 is 80 micrometers deep and has a perfectly right-angled bottom. The clamps 6 are capable of handling some non-circular cross-sectional fibres, such as fibres of triangular cross-section, in addition to fibres of circular cross-section.

After clamping of the two end portions of the working length of the fibre 2 as shown in FIG. 6, a desired working tension can be applied to the fibre by means of a force applied between the clamps 6 in a conventional manner.

Figure 10:
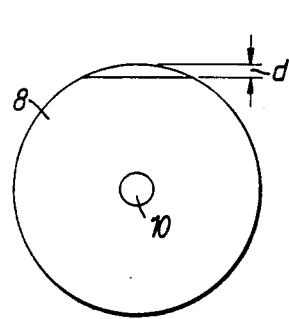
FIGS. 10 and 11 show end views of fibres cleaved by means of an embodiment of the present invention.
Figure 11:
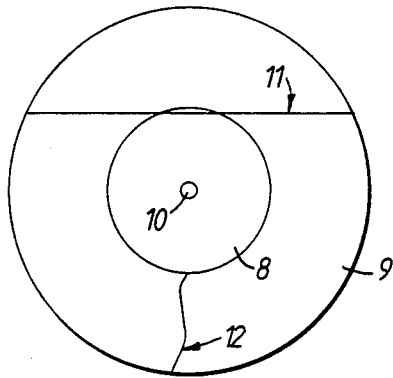

Using apparatus in accordance with FIG. 1 (without the anvil 1) or 6, embodiments of the invention have enabled consistent end angles of less than 1° to be obtained both on coated and uncoated (stripped) silica optical fibres when measured over tens of successive cleaves. The cleaved fibres as exemplified in FIGS. 10 and 11 had cladding 8 of a diameter between 80 $\mu$m and 200 $\mu$m, and typically of 125 $\mu$m. The coating material 9 (when present, as shown in FIG. 11) was ultraviolet-cured acrylate, of a diameter between 150 $\mu$m and 400 $\mu$m. The core 10 was typically of a diameter between 5 $\mu$m and 10 $\mu$m. Maximum intrusion of the blade damage into the fibre (as shown at d in FIG. 10) was about 5 $\mu$m, and was typically about 2 $\mu$m. The vibrating blade was able to cut through the plastic coating material 9 (FIG. 11) on coated fibres to reach the silica cladding 8, the line of maximum intrusion of the blade being shown at 11 in FIG. 11. Thereafter, the remaining coating material sheared when the fibre cleaved. A time delay of several seconds was sometimes noted when cleaving coated fibres; this may have been due to slow tearing of the plastic (for example so that the two tears meet at line 12 of FIG. 11) after the rapid silica fracture.

We claim:

1. A method of cleaving an optical fibre, comprising the steps of:
    supporting the said fibre in a working position;
    bringing about steady movement of a cleaving blade towards a point of lateral contact with the said fibre, behind which point the fibre is laterally unsupported; and
    superimposing on the said steady movement of the blade a vibratory component of movement, said vibratory component being towards and away from the axis of the fibre and having a frequency in a range from one kilohertz to one hundred kilohertz, thereby to facilitate the desired cleaving.

2. A method as claimed in claim 1, wherein a length of the fibre is supported in the said working position by means of first and second torsion-free clamping devices respectively holding opposite ends of the said length to support that length under tension but without torsional stress, each of the said clamping devices having one clamp face of the precision V-groove type, for receiving the fibre in the groove, and a flat opposing clamp face for retaining the fibre in the said groove, the clamp faces of both clamping devices being made of a hard material selected from the group comprising hardened steel and tungsten carbide.

3. A method as claimed in claim 2, wherein the said length of fibre between the two clamping devices is in a range from five millimeters to one hundred millimeters long.

4. A method as claimed in claim 1, wherein the said fibre has a core having a diameter in a range from five micrometers to ten micrometers.

5. A method as claimed in claim 1, wherein a core of the said fibre is surrounded by cladding, the external diameter of the cladding being in a range from eighty micrometers to two hundred micrometers.

6. A method as claimed in claim 5, wherein the fibre has a coating, surrounding the said cladding thereof, made of ultraviolet-cured acrylate.

7. A method as claimed in claim 6, wherein the external diameter of the said coating is in a range from one hundred and fifty micrometers to four hundred micrometers.

8. A method as claimed in claim 1, wherein the said vibratory component has a peak to peak vibration amplitude in a range from one micrometer to ten micrometers.

9. A method as claimed in claim 1, wherein the said steady movement of the blade is at a speed less than one meter per second.

10. Apparatus for cleaving optical fibres, comprising:
    clamp means, defining two mutually-spaced clamping locations, for holding an optical fibre extended between the two clamping locations but unsupported laterally therebetween;
    a fibre cleaving blade, adapted to be brought into lateral contact with such a fibre at a desired cleaving point between said two clamping locations, to achieve cleaving of the said fibre at the said point; and
    vibratory drive means, carrying the said blade and operable to subject it to a relatively small-amplitude vibratory component of movement superimposed on a relatively steady movement of the blade towards the said desired cleaving point, the superimposed vibratory component of the movement of the blade being towards and away from the said desired cleaving point and having a frequency in a range from one kilohertz to one hundred kilohertz.

11. Apparatus as claimed in claim 10, wherein the said clamp means comprise first and second torsion-free clamping devices for respectively holding opposite ends of a length of the said fibre to support that length extended, under tension but without torsional stress, between the said two clamping locations, each of the said clamping devices having one clamp face of the precision V-groove type, for receiving the fibre in the groove, and a flat opposing clamp face for retaining the fibre in the said groove, the clamp faces of both clamping devices being made of a hard material selected from the group comprising hardened steel and tungsten carbide.

12. Apparatus as claimed in claim 10, wherein the said vibratory drive means has a peak-to-peak vibratory operating amplitude in a range from one micrometer to ten micrometers.

13. Apparatus as claimed in claim 10, wherein the said vibratory drive means includes advancing means for producing said relatively steady movement of the blade, which movement is at a speed less than one meter per second.

* * * * *